United States Patent [19]
Kaplan

[11] Patent Number: 6,083,165
[45] Date of Patent: Jul. 4, 2000

[54] PASSIVE SENSOR SYSTEM USING ULTRASONIC ENERGY

[75] Inventor: Shay Kaplan, Givat Elah, Israel

[73] Assignee: Mizur Technology Ltd., Givat Elah, Israel

[21] Appl. No.: 09/086,754

[22] Filed: May 29, 1998

Related U.S. Application Data

[60] Division of application No. 08/800,327, Feb. 14, 1997, which is a continuation-in-part of application No. 08/379,396, Jan. 27, 1995, Pat. No. 5,619,997.

[30] Foreign Application Priority Data

Jan. 27, 1994 [IL] Israel .......................................... 108470

[51] Int. Cl.[7] ............................................................ A61B 8/00
[52] U.S. Cl. ............................ 600/438; 73/54.41; 374/117
[58] Field of Search ...................................... 600/437, 438, 600/317, 300, 549, 561; 342/44; 128/903; 73/54.41; 374/117

[56] References Cited

U.S. PATENT DOCUMENTS

| | | | |
|---|---|---|---|
| 3,853,117 | 12/1974 | Murr . | |
| 4,060,716 | 11/1977 | Pekrul et al. ............................. | 364/576 |
| 4,109,644 | 8/1978 | Kojima ..................... | 600/437 |
| 4,127,110 | 11/1978 | Bullara . | |
| 4,257,001 | 3/1981 | Partain et al. . | |
| 4,265,251 | 5/1981 | Tickner . | |
| 4,378,809 | 4/1983 | Cosman . | |
| 4,513,250 | 4/1985 | Harman . | |
| 4,513,750 | 4/1985 | Heyman et al. . | |
| 4,703,327 | 10/1987 | Rossetti et al. ............................ | 342/44 |
| 4,725,841 | 2/1988 | Nysen et al. ................................ | 342/44 |
| 5,140,997 | 8/1992 | Zuckerwa et al. ....................... | 600/528 |
| 5,195,520 | 3/1993 | Schlief et al. . | |
| 5,300,120 | 4/1994 | Knapp et al. ............................. | 623/11 |
| 5,544,656 | 8/1996 | Pitsillides et al. . | |
| 5,833,603 | 11/1998 | Kovacs et al. .......................... | 600/317 |

FOREIGN PATENT DOCUMENTS

| | | |
|---|---|---|
| 0 272 244 A3 | 6/1988 | European Pat. Off. . |
| 0 371 592 A2 | 6/1990 | European Pat. Off. . |
| 2 223 311 | 4/1990 | United Kingdom . |
| 2 235 773 | 3/1991 | United Kingdom . |

OTHER PUBLICATIONS

"Miniature Passive Pressure Transensor for Implanting in the Eye", by Carter C. Collins, IEEE Transactions on Bio–Medical Engineering, vol. BMR 14, No. 2, Apr. 1967.

W. K. Schomborg et al., "Micromembranes for Contactless Measurements Using Ultrasound", VDI Berechte No. 939, 1992.

M. Dufour et al., "A comparison between Micromachined Pressure Sensors Using Quartz or Silicon Vibrating Beams", IEEE, 1991.

*Primary Examiner*—Francis Jaworski
*Attorney, Agent, or Firm*—McDermott, Will & Emery

[57] ABSTRACT

A passive sensor system utilizing ultrasonic energy is disclosed. The passive sensor system includes at least one ultrasonically vibratable sensor and an ultrasonic activation and detection system. The sensor has at least one vibration frequency which is a function of a physical variable to be sensed. The ultrasonic activation and detection system excites the sensor and detects the vibration frequency from which it determines a value of the physical variable. The sensor includes a substrate having at least one cavity therein, and a vibratable membrane overlying the cavity. Another preferred embodiment of the sensor is a compensated sensor pair including a first sensor whose vibration frequency is responsive to the physical variable to be sensed, and a second sensor whose vibration frequency is non-responsive to the physical variable to be sensed. The second sensor provides a reference vibration frequency for compensating for the effect of other physical variables on the vibration frequency of the first sensor. Another preferred embodiment of the compensated sensor pair includes a second sensor which has a different response characteristic than that of the first sensor to the physical variable to be sensed. In still another preferred embodiment of the compensated sensor of the present invention each of the pair of sensors has multiple vibratable membranes overlying multiple cavities.

28 Claims, 6 Drawing Sheets

PASSIVE SENSOR SYSTEM USING ULTRASONIC ENERGY

This application is a division of application Ser. No. 08/800,327 filed Feb. 14, 1997, which is a continuation-in-part of application Ser. No. 08/379,396 filed Jan. 27, 1995, now U.S. Pat. No. 5,619,997.

FIELD OF THE INVENTION

The present invention relates to passive sensors in general and to ultrasonic passive sensors in particular.

BACKGROUND OF THE INVENTION

Passive sensors (for implanting into the human body or for mounting at some inaccessible location within a machine) are known in the art. These sensors are typically electromagnetic, providing an electromagnetic signal when activated.

The prior art sensor system typically comprises a sensor, implanted into the machine, and an activating and detecting system. The sensor is typically an oscillating circuit whose vibration frequency changes in response to the physical variable to be measured. The oscillating circuit typically includes a capacitor and an inductor, one of which is built to vary in accordance with the physical variable being measured. As a result, the vibration frequency of the circuit is a function of the physical variable.

When the sensor is irradiated with electromagnetic energy from the activating system, some of the energy is absorbed by the oscillating circuit, depending on how close the incident frequency or frequencies are to the resonant frequency of the circuit (which, in turn, depends on the physical variable being measured). The change in the electromagnetic field due to the absorption of energy by the oscillating circuit is detected by the detecting system.

Electromagnetic sensors and systems are described in the U.S. Pat. No. 4,127,110 and in the article:

Carter C. Collins, "Miniature Passive Pressure Transensor for Implanting in the Eye", *IEEE Transactions on Bio-Medical Engineering*, Vol. BME-14, No. 2, April 1967.

Unfortunately, within living tissue, the passive sensor is detectable within a range no larger than 10 times tne diameter of its antenna (part of the oscillating circuit). Furthermore, the sensor system is not operative within a conductive enclosure.

SUMMARY OF THE PRESENT INVENTION

It is therefore an object of the present invention to provide a passive sensor system which has none of the disadvantages listed hereinabove.

The present invention provides a passive sensor system utilizing ultrasonic energy. The passive sensor includes a vibratable element whose vibration frequency changes in response to physical variables (such as pressure, temperature, etc.). The external activating and detecting system includes an ultrasonic transducer which transmits an ultrasonic wave, having a range of frequencies, to the passive sensor which resonates in response only if the ultrasonic waves includes in it the current vibration frequency of the vibratable element Since the present invention utilizes ultrasonic waves, its range, at frequencies lower than 1 MHz, is sufficient for use in humans. Furthermore, the sensor is operative within conductive enclosures.

In accordance with a preferred embodiment of the present invention, the ultrasonic activation and detection system includes a) an ultrasonic wave generator for generating an ultrasonic wave having a desired frequency band, b) an ultrasonic transducer system for transmitting the ultrasonic wave and for receiving an ultrasonic wave in response and c) a frequency detector for detecting the vibration frequency of the sensor from the received ultrasonic wave.

Moreover, in accordance with a preferred embodiment of the present invention, the passive sensof has excitation and transmission frequencies. Additionally, the sensor can have a reference vibration frequency.

In accordance with one embodiment of the sensor, it includes a) a housing, b) a membrane attached to the housing and responsive to the physical variable, c) a vibratable beam attached to the housing at one end and d) a coupler, attached to the membrane and to a small portion of the vibratable beam, which bends the vibratable beam in response to movement of the membrane.

In accordance with another embodiment of the sensor, the vibratable beam is attached at two ends and the coupler divides the beam into two separate but coupled vibratable beams vibratable at the excitation and transmission frequencies.

Moreover, in accordance with a further preferred embodiment of the present invention, the sensor includes a) a first cup shaped body having a flat base formed of a thin membrane vibratable at the excitation frequency and b) a second cup shaped body having a flat base formed of a thick membrane vibratable at the transmission frequency. The first and second bodies are joined together so as to produce an enclosed space between them.

Furthermore, in accordance with a still further preferred embodiment of the present invention, the sensor system includes a plurality of ultrasonically vibratable sensors each having a common input vibration frequency range and at least one output vibration frequency. The ultrasonic activation and detection system transmits an ultrasonic wave having frequencies within the input frequency range and detects the separate output vibration frequencies.

Furthermore, in accordance with a still further preferred embodiment of the present invention, the sensor system includes at least one sensor including at least one cavity formed in at least one substrate and at least one vibratable membrane overlying the cavity.

Furthermore, in accordance with a still further preferred embodiment of the present invention, the cavity is a sealed cavity.

Further yet, in accordance with a still further preferred embodiment of the present invention, the vibratable membrane is sensitive to a physical variable selected from the group consisting of chemical concentration and the thickness of a layer of a substance overlying the sensor;

Furthermore, in accordance with a still further preferred embodiment of the present invention, the system also includes a data processor for converting the detected vibration frequency to the value of said physical variable.

There is also provided in accordance with a still further preferred embodiment of the present invention, a passive compensated sensor system utilizing ultrasonic energy. The system includes at least one compensated pair of ultrasonically vibratable sensors, each of the sensors of one compensated pair of passive sensors having at least one vibration frequency which is a function of a physical variable to be sensed. The system further includes an ultrasonic activation and detection system for exciting the compensated pair of sensors and for detecting the vibration frequency of each of the sensors thereby to determine a compensated value of the physical variable.

Furthermore, in accordance with a still further preferred embodiment of the present invention, each sensor of the compensated pair of passive sensors includes at least one cavity formed in at least one substrate and at least one vibratable membrane overlying the cavity.

Furthermore, in accordance with a still further preferred embodiment of the present invention, the ultrasonic activation and detection system includes an ultrasonic wave generator for generating an ultrasonic wave having a desired frequency band, an ultrasonic transducer system for transmitting the ultrasonic wave and for receiving an ultrasonic wave in response and a frequency detector for detecting the vibration frequencies of the compensated pair of sensors from the received ultrasonic wave, thereby to determine a compensated value of the physical variable.

Further yet, in accordance with a still another preferred embodiment of the present invention, the compensated pair of passive sensors is formed in a single slab of material forming the substrate.

Still further, in accordance with yet another preferred embodiment of the present invention, the sensors of the compensated pair of passive sensors are separate sensors, formed in two separate slabs of material, each of the slabs forming the substrate for a single sensor.

Furthermore, in accordance with still another preferred embodiment of the present invention, the at least one cavity of one sensor of the compensated pair of passive sensors is a sealed cavity.

Furthermore, in accordance with still another preferred embodiment of the present invention, the vibratable membranes have different areas for each of the sensors of the compensated pair of passive sensors.

Further yet, in accordance with still another preferred embodiment of the present invention, the vibratable membranes of each of the sensors of the compensated pair of passive sensors, have non-overlapping output vibration frequencies.

Still further, in accordance with yet another preferred embodiment of the present invention, the vibratable membranes of each of the sensors of the compensated pair of passive sensors have an approximately equal area and thickness.

Further still, in accordance with yet another preferred embodiment of the present invention, the vibratable membranes of each of the sensors of the compensated pair of passive sensors have approximately similar output vibration frequencies.

Furthermore, in accordance with still another preferred embodiment of the present invention, the physical variable to be sensed is pressure, and at least one vibratable membrane of the compensated pair of passive sensors has a hole therethrough for equalizing the pressure within and without the cavity of the sensor, thereby rendering the vibratable membrane non-responsive to pressure changes without substantially changing the responsiveness of the vibratable membrane to physical variables other than pressure. Thus, the vibratable membrane is operative to provide a reference vibration frequency for compensating the effects of physical variables other than pressure on the vibration frequency of the vibratable membrane of the other sensor of the compensated pair of passive sensors.

Furthermore, in accordance with still another preferred embodiment of the present invention, the vibratable membrane of one of the compensated pair of passive sensors further includes a film attached thereto, the film being exposed to the sensor's external environment. The film is made of a material capable of selectively adsorbing a specific chemical from the external environment, thereby making the vibratable membrane responsive to the concentration of the specific chemical within the external environment.

Furthermore, in accordance with still another preferred embodiment of the present invention, the sensors of the compensated pair of passive sensors are within close proximity of each other.

There is also provides, in accordance with still another p erred embodiment of the present invention, a method of measuring a physical variable of a body, the method including the steps of activating, via an ultrasonic wave, a passive sensor located within the body and having a vibration frequency which is a function of the physical variable and detecting the vibration frequency. The physical variable is selected from the group consisting of chemical concentration, and the thickness of a layer of a substance overlying the sensor.

There is further provided, in accordance with still another preferred embodiment of the present invention, a method of measuring a physical variable of a body. The method includes the steps of transmitting an ultrasonic wave having a first range of vibration frequencies through the body, thereby to activate a passive sensor located within the body, the passive sensor having an input vibration frequency within the first range and an output frequency, wherein at least the output frequency is a function of the physical variable, and detecting the output vibration frequency. The physical variable is selected from the group consisting of chemical concentration, and the thickness of a layer of substance overlying the sensor.

Furthermore, in accordance with still another preferred embodiment of the present invention, one of the two vibration frequencies of the compensated pair of passive sensors is non-responsive to the physical variable and the step of determining includes the step of using the non-responsive vibration frequency as a reference frequency, thereby compensating for the effect of other physical variables on the vibration frequency responsive to the physical variable.

Furthermore, in accordance with still another preferred embodiment of the present invention, the two vibration frequencies are substantially non-overlapping.

There is further provided, in accordance with still another preferred embodiment of the present invention, a method of measuring a physical variable of a body, the method including the steps of activating, via an ultrasonic wave, at least one compensated pair of passive sensors located within the body and having two output vibration frequencies which are substantially close to each other, at least one of the output vibration frequencies being a function of the physical variable, detecting the beat frequency created by the two output vibration frequencies and determining a compensated value of the physical variable from the detected beat frequency.

Furthermore, in accordance with still another preferred embodiment of the present invention, each of the two vibration frequencies is differently responsive to the physical variable.

Further yet, in accordance with still another preferred embodiment of the present invention, one of the two vibration frequencies of the compensated pair of passive sensors is a reference frequency which is non-responsive to the physical variable and the other vibration frequency is responsive to the physical variable. Additionally, the step of determining includes the step of using the beat frequency, created by the non-responsive reference frequency and the responsive vibration frequency, to determine a value of the physical variable compensated for the effect of other physical variables on the vibration frequency responsive to the physical variable.

There is further provided, in accordance with still another preferred embodiment of the present invention, a method of measuring a physical variable of a body. The method includes the steps of transmitting an ultrasonic wave having a first range of vibration frequencies through said body thereby to activate at least one compensated pair of passive sensors located within the body, the compensated pair of passive sensors having at least one input vibration frequency within the first range, and two output frequencies outside of the first range, wherein at least one of the output vibration frequencies is a function of the physical variable, detecting the two output vibration frequencies, and determining the value of the physical variable from the detected two output vibration frequencies.

Finally, there is further provided, in accordance with still another preferred embodiment of the present invention, a method of measuring a physical variable of a body. The method includes the steps of a) transmitting an ultrasonic wave having a first range of vibration frequencies through the body thereby to activate at least one passive compensated pair of sensors located within the body, the passive compensated pair of sensors having at least one input vibration frequency within the first range, and two output frequencies outside of the first range, the two output vibration frequencies being substantially close to each other, b) detecting the beat frequency created by the two output vibration frequencies and c) determining the value of the physical variable from the detected beat frequency.

BRIEF DESCRIPTION OF THE DRAWINGS

The present invention will be understood and appreciated more fully from the following detailed description taken in conjunction with the drawings in which:

FIGS. 3A and 3B are schematic illustrations of an alternative sensor having two coupled vibrating beams and a reference beam, wherein FIG. 3A is a side view and FIG. 3B is a top view taken along lines IIIB—IIIB of FIG. 3A;

DETAILED DESCRIPTION OF THE INVENTION

Figure 1:
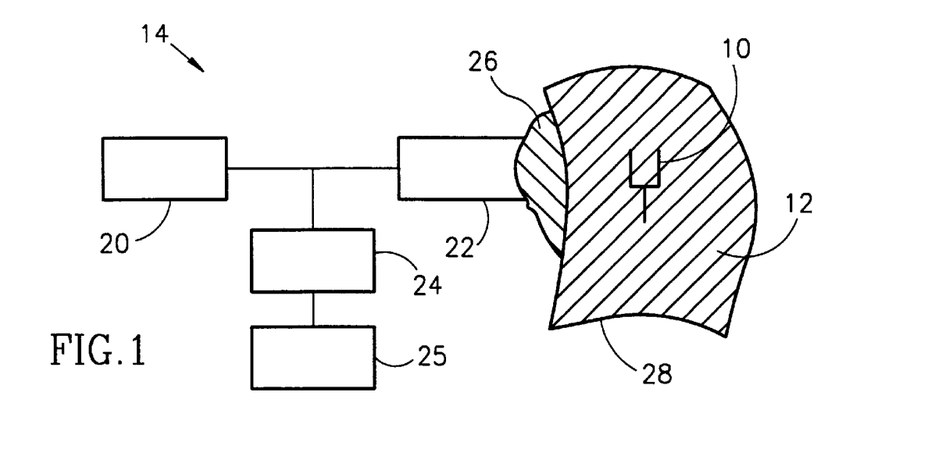
FIG. 1 is a schematic illustration of an ultrasonic passive sensor system, constructed and operative in accordance with a preferred embodiment of the present invention.

Reference is now made to FIG. 1 which illustrates the ultrasonic sensor system of the present invention. The system comprises a passive sensor 10 and an external ultrasonic activation and detection system 14. The sensor 10 is implantable in an ultrasound compatible medium 12, such as the human body, or mountable on an inner wall of an enclosure.

The sensor 10 is any suitable sensor, examples of which are described hereinbelow with respect to FIGS. 2–4, which mechanically vibrates in the presence of an ultrasonic wave, much as a tuning fork vibrates in the presence of a sonic wave. Therefore, sensor 10 is represented schematically in FIG. 1 as a tuning fork. The frequency of vibration of sensor 10 is its current vibration frequency which is a function at least of the physical variable being sensed.

The activation and detection system 14 typically comprises an ultrasonic generator 20, at least one ultrasonic transducer 22, a frequency detector 24 and a data processor 25. The ultrasonic generator 20 and transducer 22 constitute the activating elements and the transducer 22, the frequency detector 24 and the data processor 25 constitute the detecting elements.

The generator 20, such as the non destructive testing unit, model IIB USDF, manufactured by Balteu Sonatest/Schlumberger of Milton Keynes, England, generates an ultrasonic wave to be transmitted by the ultrasonic transducer 22 to the sensor 10 via the medium 12. Typically, ultrasonic gel 26, located on an outer edge 28 of medium 12, is utilized to couple the transducer 22 to the medium 12. Typically, the transmitted ultrasonic wave is composed of a single frequency or a range of frequencies.

The ultrasonic transducer 22, such as one part of the nondestructive testing unit, typically also receives ultrasonic waves from the medium 12. Some of these waves are reflections of the transmitted wave; others are from sensor 10. In an alternative embodiment, there are two ultrasonic transducers 22, one for transmitting and one for receiving.

If the transmitted ultrasonic waves have a frequency close or equivalent to the current vibration frequency of the sensor 10, they will excite the sensor 10 to vibrate, in effect, absorbing at least some of the transmitted wave at the current vibration frequency. Thus, the waves received by transducer 22 include less of the current vibration frequency of sensor 10 than of other frequencies. In addition, the sensor 10 continues to vibrate even after transmission of ultrasonic waves has stopped. Thus, the transducer 22 continues to receive ultrasonic waves and these are at the current vibration frequency of sensor 10.

The frequency detector 24, similar to the Model 8590A spectrum analyzer manufactured by Hewlett Packard Inc. of the U.S.A., analyzes the received ultrasonic waves to determine which frequency has been absorbed by sensor 10 and/or at which frequency the sensor 10 resonates when no longer excited by the transmitted ultrasonic waves.

Data processor 25 converts the frequency determined by the frequency detector 24 into the value of the physical variable being measured. The information needed for this conversion depends on the actual structure of the sensor 10, as described in more detail hereinbelow.

It will be appreciated that the system of the present invention is implantable deep within living tissue or within a conductive enclosure. The system operates with mechanical vibration rather than electromagnetic resonance.

Figure 2A:
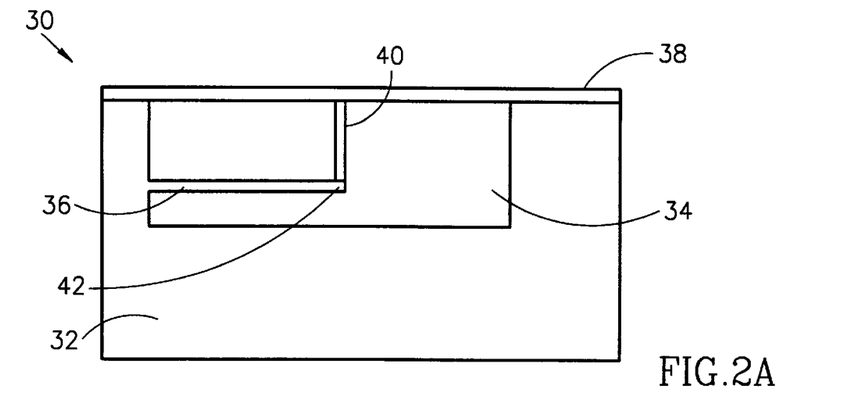
FIG. 2A is a schematic illustration of an passive sensor useful in the sensor system of FIG. 1.
Figure 2B:
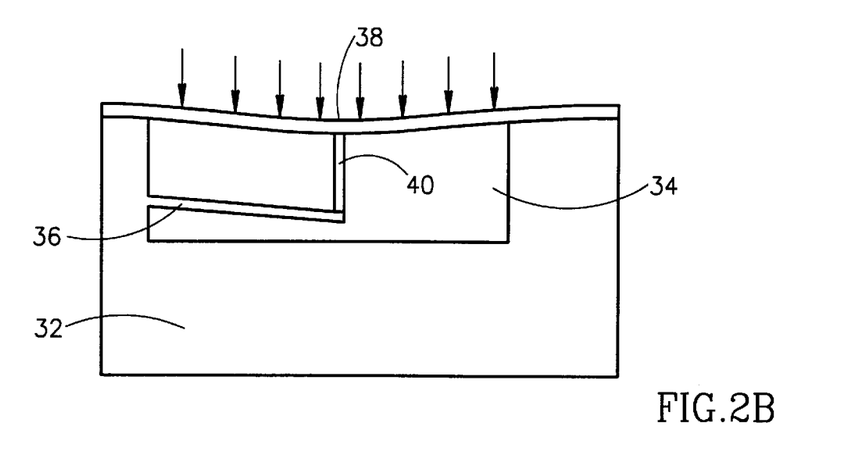
FIG. 2B is a schematic illustration of the sensor of FIG. 2A in the presence of pressure.

Reference is now made to FIGS. 2A and 2B which illustrate a first embodiment of an exemplary passive sensor, labeled 30, responsive to pressure. FIGS. 2A and 2B illustrate the sensor 30 in the absence and presence, respectively, of pressure.

Sensor 30 is typically machined from silicon and typically comprises a cup-shaped housing 32 having a recess 34, a vibratable beam 36, a membrane 38 and a coupler 40. The vibratable beam 36 is typically integrally attached to the housing 32 and extends into recess 34. The coupler 40 typically connects between membrane 38 and a far end 42 of beam 36. The coupler 40 is either integrally attached to the membrane 38 or the vibratable beam 36.

As shown in FIG. 2B, membrane 38 typically bends into recess 34 in response to pressure from the outside. This causes coupler 40, which is stiff, to press on far end 42, inducing beam 36 to bend and thus, straining it. As is known in the art, a strained beam vibrates at a higher frequency than a non-strained beam. Thus, the higher the pressure on membrane 38, the higher the vibration frequency of beam 36. The specific relationship between pressure and frequency of beam 36 depends on the material of beam 36, its length and its cross-sectional area and to some extent on other factors, such as temperature and viscosity of whatever medium is within recess 34.

It is noted that, if the membrane was made of many materials or coated with other materials, it would bend in response to other physical variables, such as temperature. For example, FIG. 2C illustrates a sensor responsive to temperature and FIG. 4B, described hereinbelow, illustrates a sensor responsive to chemical composition.

Figure 2C:
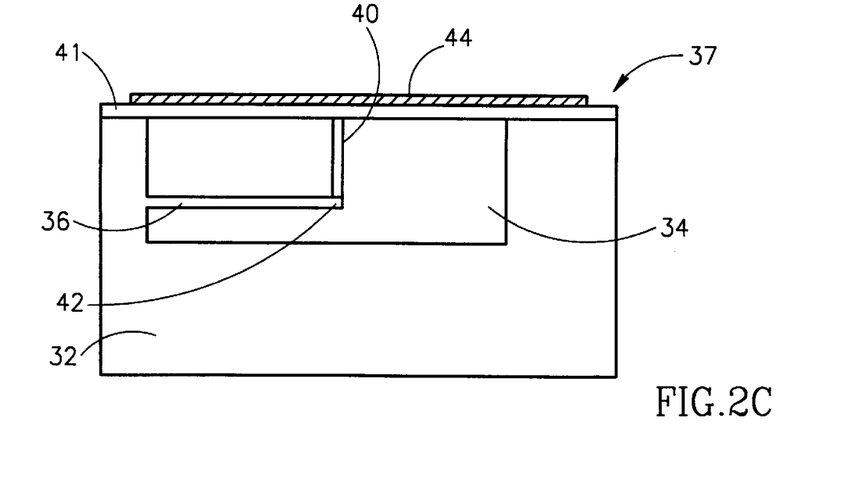
FIG. 2C is a schematic illustration of a sensor, similar to that of FIG. 2A, which is sensitive to temperature.

Reference is now briefly made to FIG. 2C. In this sensor, the membrane 37 is made of two materials, 41 and 44, each having different thermal coefficients. Exemplary materials are silicon and silicon nitride. Since the materials expand and contract at different rates, the membrane 37 will buckle as a function of the temperature.

Figure 3A:
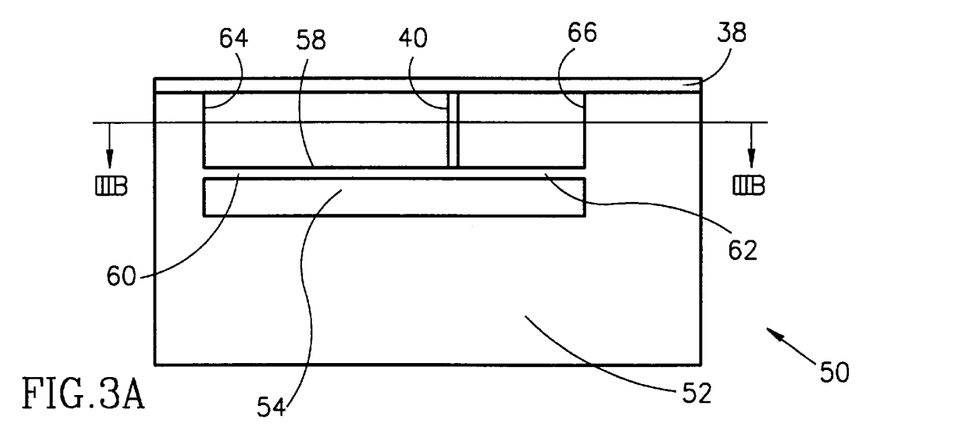
Figure 3B:
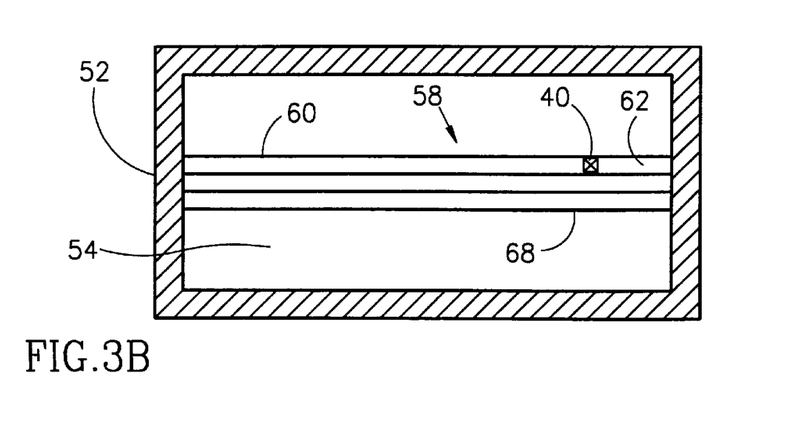

Reference is now made to FIGS. 3A and 3B which illustrate an alternative embodiment of the passive sensor which has different transmission and reception frequencies. Furthermore, the sensor of FIGS. 3A and 3B also has a reference frequency. FIG. 3A is a side view of the sensor, labeled 50, and FIG. 3B is a top view taken along lines IIIB—IIIB of FIG. 3A.

The sensor 50 is similar to sensor 30 (FIG. 2) in that it has a housing, labeled 52, and a recess 54. However, the vibratable element of sensor 50 is a full length beam 58. Similar to sensor 30, sensor 50 also has a membrane 38 and a coupler 40. In this embodiment, coupler 40 is connected to beam 58 somewhere other than at its middle so as to create two separate but coupled vibratable beams 60 and 62 which vibrate at different frequencies.

As illustrated in FIG. 3A, beam 60, defined as the length of beam 58 from a left edge 64 of housing 52 to coupler 40, is longer than beam 62, defined as the length of beam 58 from a right edge 66 of housing 52 to coupler 40. Therefore, beam 60 vibrates at a lower frequency than beam 62.

In the presence of presure, membrane 38 bends, pushing coupler 40 further into recess 54 and bending beam 58, straining both beams 60 and 62. When in operation, the sensor system of the present invention excites sensor 50 with an ultrasonic wave whose range of frequencies is approximately the range of vibration frequencies of long beam 60. The long beam 60 becomes excited and its excitation causes short beam 62 also to vibrate, but at its current vibration frequency.

Since the short beam 62 typically has a vibration frequency range significantly different than that of the long beam 60, the ultrasonic transducer 22 and frequency detector 24 need only be tuned, for reception purposes, to the frequency range of short beam 62. Since only the short beam 62 will be active in its frequency range, the signal to noise (S/N) ratio of the signal received by the transducer 22 will be high since there will be little or no noise associated with the excitation frequency.

The sensor 50 can optionally also include a reference beam 68 (FIG. 3B), located next to beam 58. Beam 68 is connected at both ends to housing 52 but is not connected to coupler 40. Therefore, the vibration frequency of beam 68 does not change with pressure. Any changes of its vibration frequency must therefore be due to other causes, such as temperature, viscous damping, etc., which also affect the beams 60 and 62. The output of reference beam 68 is thus utilized, by data processor 25, to correct the pressure values determined from beams 60 and 62.

Figure 4A:
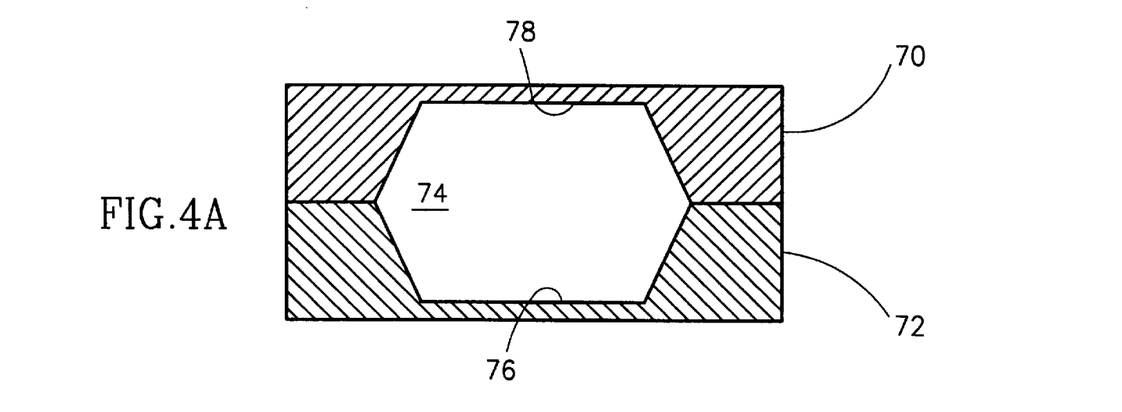
FIG. 4A is a schematic illustration of an alternative two membrane sensor.

Reference is now briefly made to FIG. 4A which illustrates a further alternative embodiment of the sensor formed of two silicon wafers 70 and 72. Typically, each wafer is formed into roughly a squared off cup shape and the two are bonded together so as to produce an enclosed space 74. The base of each cup is flat, forming a membrane which can freely vibrate into space 74. In order to provide the sensor of FIG. 4A with two different, coupled frequencies, the thickness of the membranes, labeled 76 and 78, is different.

As in the embodiment of FIG. 3A, the vibrating element with the lower vibration frequency, (i.e. thin membrane 78) receives the ultrasonic signal and the other membrane, thick membrane 76, transmits the reflected ultrasonic signal. The two vibrating elements are coupled via the sides of the wafers 70 and 72 and through whatever medium is placed into enclosed space 74.

A sensor similar to that shown in FIG. 4A can be used to measure chemical composition. The resultant sensor is illustrated in FIG. 4B to which reference is now made. The thick membrane 76 of FIG. 4B is coated with a thin, soft, polymeric film 79 which absorbs gas or liquid phase analytes. The analytes add weight to film 79 and may also change its viscoelasticity. As a result, the vibration frequency changes.

Figure 5:
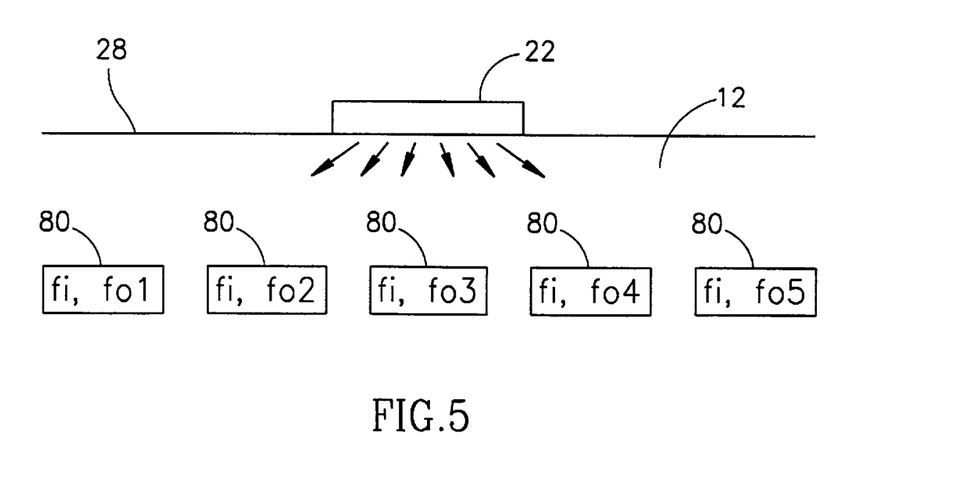
FIG. 5 is a schematic illustration of a sensor system operating with a plurality of passive sensors.

Reference is now made to FIG. 5 which illustrates a sensor system having a plurality of passive sensors 80. The sensors 80 typically have at least two vibration frequencies, an input frequency fi and an output frequency $fo_i$, where, in the example of FIG. 5, i=1 to 5. The input frequency can be identical for each sensor 80, or it can be within a predetermined range.

The output frequencies $fo_i$ are typically designed to be in separate, non-overlapping frequency ranges such that each sensor is separately detectable for all values of the physical variable being measured. In this manner, the value of the physical variable can be measured along a line, or within a region, at one time.

Figure 4B:
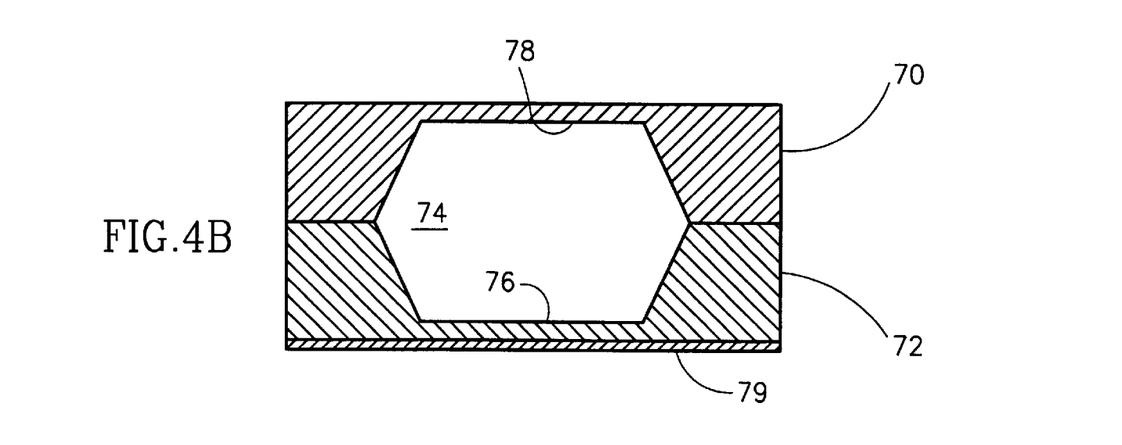
FIG. 4B is a schematic illustration of a sensor, similar to that of FIG. 4A, which is sensitive to chemical composition.
Figure 6:
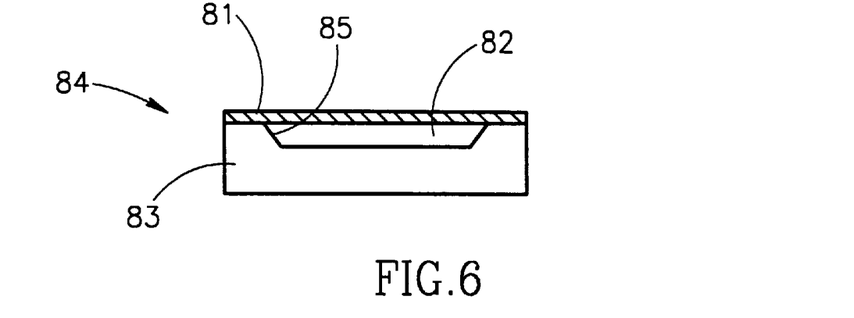
FIG. 6 is a schematic illustration of a cross section of an alternative sensor having a single flat membrane.
Figure 7:
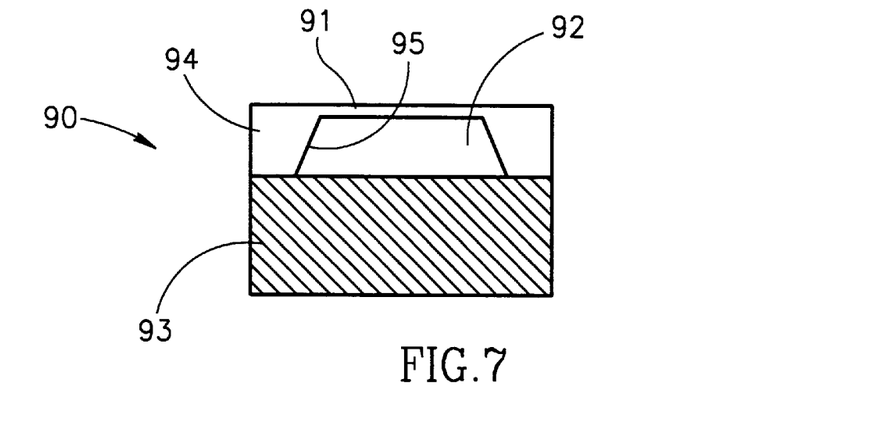
FIG. 7 is a schematic illustration of a cross section of an additional alternative sensor having a single membrane.
Figure 8:
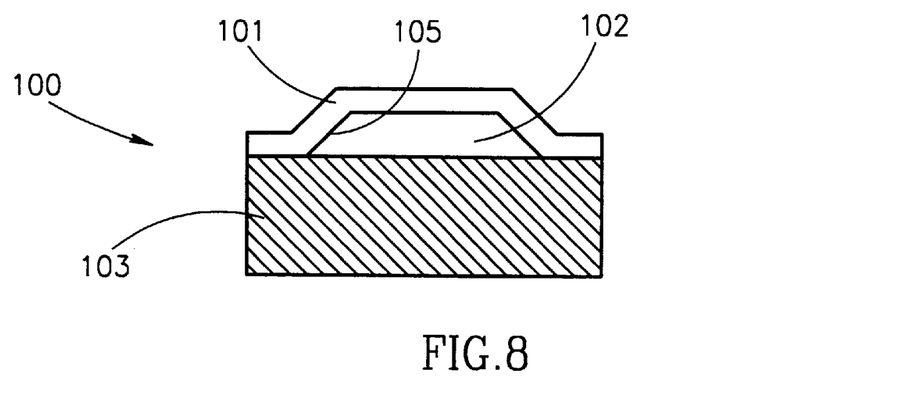
FIG. 8 is a schematic illustration of a cross section of yet another alternative sensor having a single cup shaped membrane.

The sensors 80 can be formed of sensors similar to those shown in FIGS. 3 and 4. For a set of sensors similar to those of FIG. 3, the lengths of each of the long beams are of a similar length while the lengths of the short beams are significantly different. For a set of sensors similar to those of FIG. 4, the thin membranes of each are of a similar thickness but the thickness of the thick membranes are different Reference is now made to FIGS. 6–8 illustrating various different preferred embodiments of passive ultrasonic sensors including a membrane part which is a vibratable element. The resonance frequency of the membrane changes with changes in the measured physical variable.

FIG. 6 illustrates a passive ultrasonic sensor 84 having a vibratable membrane constructed and operative in accordance with a preferred embodiment of the present invention. Sensor 84 includes a substrate 83 having a cup shaped recess 85 therein. Sensor 84 also includes a flat membrane 81 that is relatively thin compared to the substrate 83. The membrane 81 is bonded to the substrate 83, forming a sealed cavity 82. The recess 85 in substrate 83 can be formed by etching techniques or by any other suitable technique. The membrane 81 can be formed by first bonding a thick membrane to the substrate 83 and then thinning the thick membrane to the desired thickness. This has the advantage that the thick membrane is easier to manufacture and handle than a thin membrane. However other suitable methods can also be used for constructing the sensor 84.

FIG. 7 illustrates a passive ultrasonic sensor 90 having a vibratable membrane constructed and operative in accordance with another preferred embodiment of the present invention. Sensor 90 includes a first flat substrate 93 and a second cup shaped substrate 94 bonded thereto. The second substrate 94 integrally includes a flat membrane 91 that is relatively thin compared to the first substrate 93. Membrane 91 serves as the vibratable membrane of sensor 90. The sensor 90 also includes a sealed cavity 92 underlying the membrane 91.

Sensor 90 can be constructed by first producing the second substrate 94 by forming a cup shaped recess 95 in a thick flat substrate as disclosed hereinabove for the substrate 83 of sensor 84 (FIG. 6), and bonding the second cup shaped substrate 94 to the first substrate 93. Alternatively, sensor 90 can be constructed by first forming a recess in a substrate having a greater thickness than the second cup shaped substrate 94, bonding the thicker recessed substrate to the first substrate 93 and then thinning the thicker substrate to the desired thickness.

FIG. 8 illustrates a passive ultrasonic sensor 100 having a vibratable membrane constructed and operative in accordance with yet another preferred embodiment of the present invention. Sensor 100 includes a first flat substrate 103 and a second cup shaped substrate 101 bonded thereto. The second substrate 101 constitutes a membrane that is relatively thin compared to the first substrate 103. Part of the second substrate 101 serves as the vibratable membrane of sensor 100. The sensor 100 also includes a sealed cavity 102 underlying the vibratable membrane of sensor 100.

Sensor 100 can be constructed by first forming a recess 105 in a substrate having a greater thickness than that of the second substrate 101, diffusing an etch stop material, such as boron, into the recessed surface to a depth corresponding to the final desired membrane thickness, bonding the recessed substrate to the first substrate 103 and etching the bonded recessed substrate back to the etch stop layer, Sensors 84, 90 and 100 include a thin vibratable membrane sealing an underlying cavity. The resonance frequency of the membrane changes with pressure because the membrane stretches under pressure. The resonance frequency will also change if the viscosity of the liquid in touch with the membrane changes. Additionally, changes in other physical variables can change the resonance frequency of the membrane. For example, in sensor 84 (FIG. 6), if the membrane 81 and the substrate 83 are made of different materials having different thermal expansion coefficients, the resonance frequency will change with a change in the sensor temperature.

Further, if the vibratable membrane of any of the sensors 84, 90 and 100 is partially or entirely coated with a film of a material that selectively adsorbs a certain chemical, similar to the film 79 of the sensor of FIG. 4B, the resonance frequency of the membrane will change with changes in the concentration of that chemical in the medium contacting the membrane, as disclosed hereinabove. This change occurs due to the fact that the amount of chemical adsorbed on the membrane coating is proportional to the concentration of the chemical in the medium. Thus, the mass of the vibratable membrane will also change depending on the concentration of the chemical in the medium leading to a change in the resonance frequency of the membrane. This has the advantage of enabling the construction of various sensors that are selectively sensitive to specific chemicals by using different chemically selective adsorbing coating materials.

It is noted that, such selective chemo-sensitive passive ultrasonic sensors can be used for implantation within a living body, either within a certain tissue or in the lumen of blood vessels or in other body cavities, in order to monitor the concentration of specific chemicals in the blood or other body fluids.

Selective chemo-sensitive passive ultrasonic sensors can also be used for other applications including the monitoring of the concentration of chemicals in relatively inaccessible or sealed environments such as chemical reactors , sterile environments, sterile bio-reactors or fermentation reactors.

Furthermore, if any material is deposited on the vibratable membrane's surface the resonance frequency will also change. This can be used in monitoring the thickness of deposits on the membrane of the sensor. For example, when implanted in living tissue such a sensor can be used to monitor the formation of scar tissue. Another exemplary application is the measurement of the thickness of scale formed in hot water boilers, radiators and tubes.

Since more than one physical variable can affect the resonance frequency of the vibratable membrane of the sensors of FIGS. 6–8 such sensors may need to be compensated for changes in physical variables that are different from the physical variable to be measured. For example changes in the temperature may affect the resonance frequency of a sensor for measuring pressure.

Figure 9:
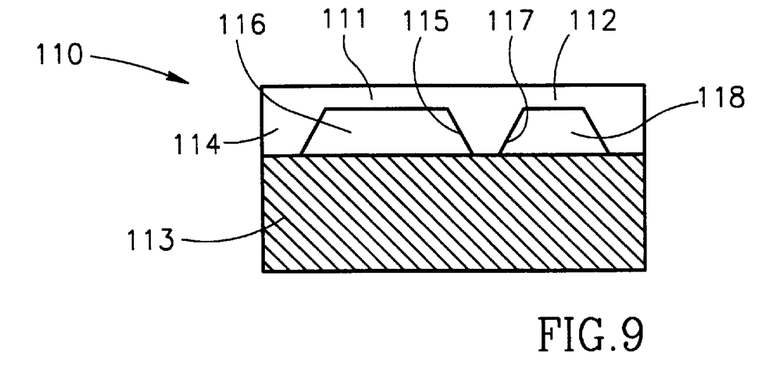
FIG. 9 is a schematic illustration of a cross section of an alternative sensor having two membranes of unequal areas.
Figure 10:
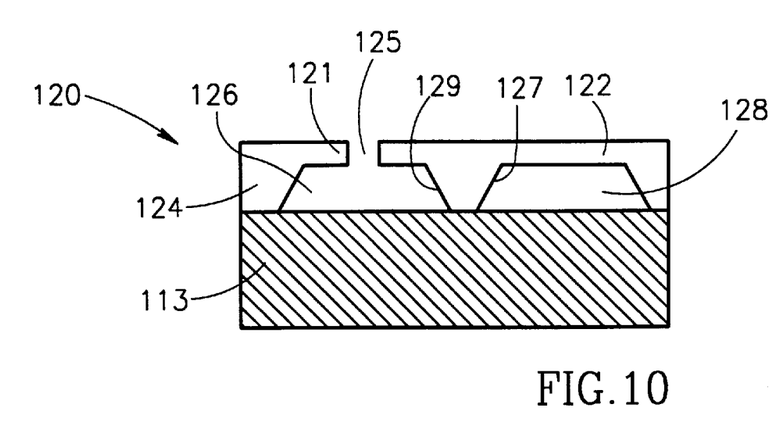
FIG. 10 is a schematic illustration of a cross section of an alternative compensated pressure sensor having two membranes of equal area, one membrane overlying a sealed cavity and the other membrane overlying an open cavity.
Figure 11:
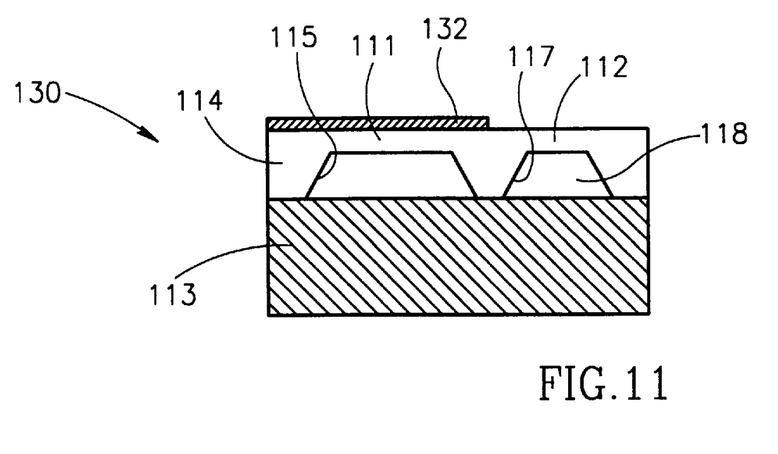
FIG. 11 is a schematic illustration of a cross section of an alternative compensated sensor having two membranes of unequal areas which is sensitive to chemical composition.

Reference is now made to FIGS. 9–11 illustrating compensated passive ultrasonic sensors having two vibratable membranes constructed and operative in accordance with additional preferred embodiments of the present invention. It is noted that for a better understanding, like components are designated by like reference numerals throughout the various figures.

FIG. 9 is a schematic illustration of a compensated sensor 110 in accordance with another preferred embodiment of the present invention.

The sensor 110 includes a first flat substrate 113 and a second recessed substrate 114 bonded to the first substrate 113. The recessed substrate 114 has two recesses 115 and 117 therein, forming two sealed cavities 116 and 118 within sensor 110. The recessed substrate 114 also integrally includes two membranes 111 and 112 overlying the sealed cavities 116 and 118, respectively. The membranes 111 and 112 are thin relative to the substrate 113 and have different dimensions, the area of membrane 111 being larger than the area of membrane 112. Consequently the resonance frequencies of the membranes 111 and 112 will be different. Preferably the membranes 111 and 112 of the sensor 110 are constructed such that their resonance frequencies do not overlap over the working range.

When two vibratable membranes formed within the same substrate are designed to have two separate resonance frequencies which do not overlap over the working range, the frequency response of the two different membranes to different physical variables will be different, For example since both membranes are exposed to the same pressure and temperature, their frequency changes due to changes in the pressure and temperature will be different. This allows the calculation of the value of the pressure independently of the effect of temperature.

It is noted that this compensation can be performed for other parameter groups. For example the viscosity of the fluid in contact with the membrane can be calculated by similarly compensating for the effects of temperature and pressure.

Another method for measuring the value of a physical variable without interference from changes of other different physical variables is to neutralize the influence of the measured variable on the resonance frequency of one of a pair of essentially similar sensors that are in close proximity to each other. For example, FIG. 10 to which reference is now made, illustrates a sensor 120 constructed and operative in accordance with a preferred embodiment of the present invention for measuring changes in pressure while compensating for changes in other physical variables such as temperature and viscosity.

The sensor 120 includes a flat substrate 113 and a recessed substrate 124 that are bonded together. The recessed substrate 124 has two substantially equally sized recesses 127 and 129 therein, forming two cavities 128 and 126, respectively, within sensor 120. The recessed substrate 124 also integrally includes two membranes 121 and 122 overlying the cavities 126 and 128, respectively. The membranes 121 and 122 can have approximately equal areas (FIG. 10), or may be of different areas. Both membranes are thin relative to the substrate 113. Membrane 121 has a hole 125 therewithin. Thus, while the cavity 128 is sealed, cavity 126 is an open cavity and the pressure within cavity 126 is equal to the pressure outside the sensor 120.

It is noted that although the membranes 121 and 122 of FIG. 10 are shown to have approximately equal areas, their areas may also be different from each other similarly to the membranes 111 and 112, respectively, of FIG. 9.

When the dimensions of the membranes 121 and 121 are different, in accordance with an embodiment of the present invention, the measuring method is based on determination of the two resonance frequencies of the both the vibratable membranes. In contrast to membrane 122, overlying the sealed cavity 128, whose resonance frequency is pressure sensitive, membrane 121 overlies the open cavity 125, and has a resonance frequency which is insensitive to pressure changes. Thus, the resonance frequency of both of the membranes 121 and 122 will be affected by physical parameters other than pressure such as temperature and viscosity, but only the resonance frequency of the membrane 122 will be affected by pressure changes. Thus, the value of the pressure, compensated for changes due to other physical variables such as temperature and viscosity, can be determined from the two resonance frequencies.

When the dimensions of the membranes 121 and 121 are approximately equal, in accordance with another embodiment of the present invention, they have nearly equal resonance frequencies. In contrast to membrane 122 whose resonance frequency is pressure sensitive, membrane 121 is insensitive to pressure changes. Thus, the resonance frequency of the membranes 121 and 122 will be nearly equally affected by physical parameters other than pressure such as temperature and viscosity, but only the resonance frequency of the membrane 122 will be affected by pressure changes.

Thus, the measuring method is based on determination of the physical variable to be measured by measuring the beat frequency resulting from the interference of the two acoustic waves emitted by the two vibratable membranes which have close emission frequencies. This method can be implemented in sensors that have two vibratable membranes formed in the same substrate (FIGS. 9–11) or by using pairs of separate sensors, each having a single vibratable membrane, the sensors being in close proximity to each other and having close resonance frequencies.

It is a feature of the sensor 120 of the present invention that the effect of physical variables other than pressure can be compensated for by measuring the two different resonance frequencies of the two membranes 121 and 122 when the membranes 121 and 122 have different areas or by measuring the beat frequency created by the two close resonance frequencies of the membranes 121 and 122 when the areas of the membranes 121 and 122 are substantially equal.

Reference is now made to FIG. 11 illustrating a compensated sensor having two vibratable membranes constructed and operative for measuring the concentration of a chemical compound in the sensor's environment and for compensating the effects of other physical variables on the results.

The sensor 130 is similar in construction to the sensor 110 of FIG. 9 except that it further includes a film of a material 132. The film 132 is designed to selectively adsorb a specific chemical such as a specific gas or a specific ion or a specific molecule from the sensor's environment. The film 132 is attached to the membrane 111 but not to the membrane 112. When the film 132 adsorbs a chemical from the surrounding environment, its mass changes, changing its viscoelasticity and causing a change in the resonance frequency of the membrane 111. The membrane 112 is a reference membrane resonating at a different frequency from that of the membrane 111. The changes in frequency can be compensated for the effect of changes in other physical variables such as temperature and pressure by determining the change in resonance frequency of the reference membrane 112 as disclosed for the sensor 110 of FIG. 9.

It is noted that, in accordance with another preferred embodiment of the present invention, compensated or non-compensated passive sensors having a multiplicity of vibratable membranes can be constructed. Since the dimensions of a single vibratable membrane vibrating in the ultrasonic sound frequency range may be constrained within a limited range of dimensions, the signal amplitude emitted by a single vibratable membrane is limited. In cases where it is desirable to increase the amplitude of the passive sensor's signal without increasing the physical dimensions of a single vibratable membrane, a multiplicity of vibratable membranes can be constructed within the same sensor. An advantage of such a multi-membrane sensor is an increased signal to noise ratio. An additional advantage of a multi-membrane sensor is that, while a single vibratable membrane has a generally narrow beam width within which most of the ultrasonic radiation is transmitted, various geometrical arrangements of vibratable membranes in a multi-membrane sensor can produce wider transmission beams, thus enabling more flexibility in the positioning of the frequency detector.

Figure 12:
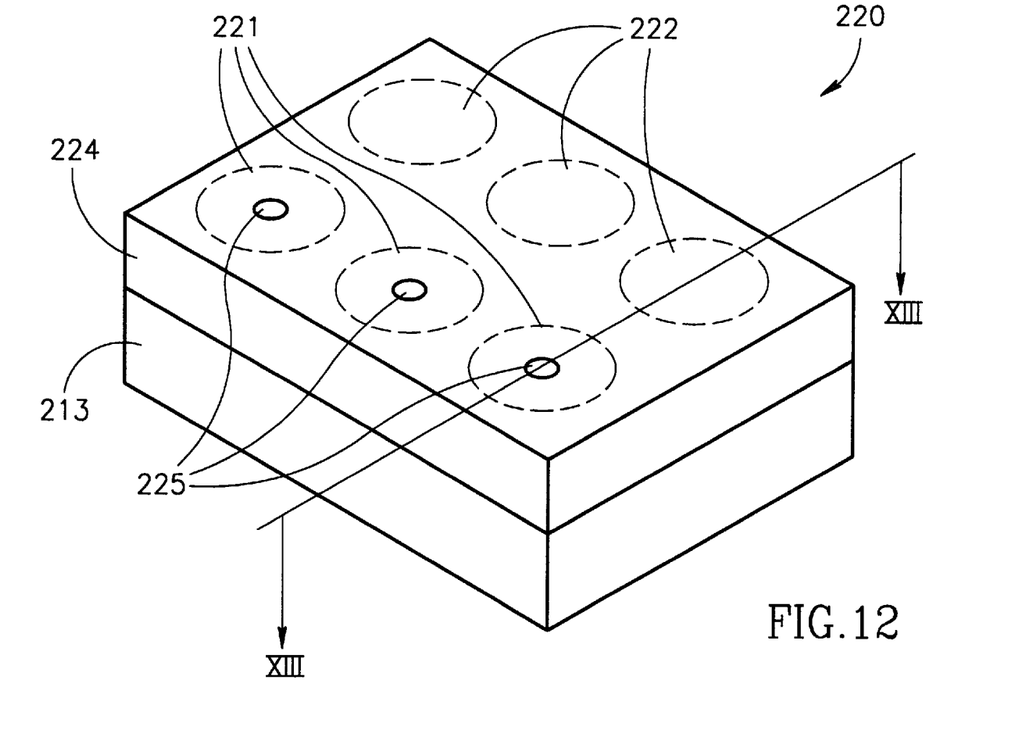
FIG. 12 is a schematic isometric view of a compensated pressure sensor having six vibratable membranes in accordance with a preferred embodiment of the present invention.
Figure 13:
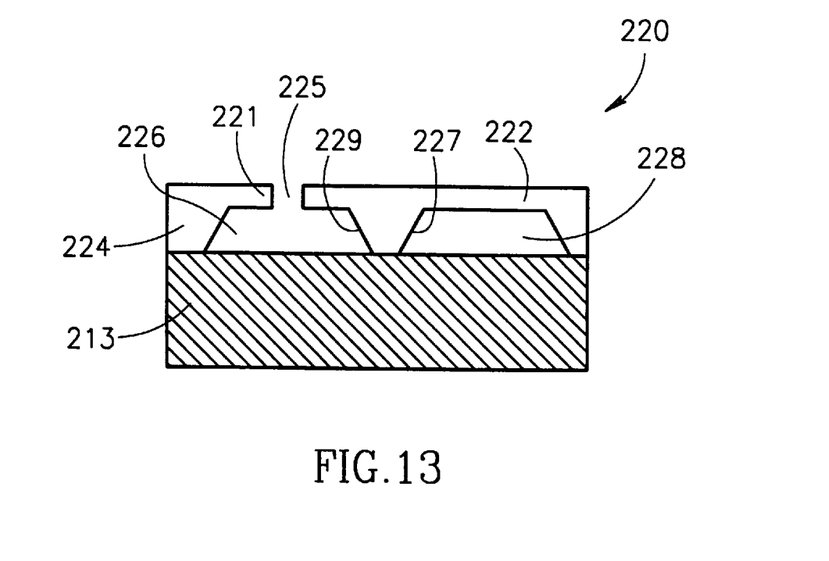
FIG. 13 is a schematic illustration of a cross section of the compensated sensor of FIG. 12 taken along lines XIII—XIII.

Reference is now made to FIGS. 12 and 13 illustrating a passive compensated pressure sensor 220 including six vibratable membranes, in accordance with another preferred embodiment of the present invention. FIG. 12 is a schematic isometric view of the sensor 220 and FIG. 13 is a schematic illustration of a cross section of the sensor 220 taken along lines XIII—XIII.

The sensor 220 is constructed for measuring changes in pressure while compensating for changes in other physical variables, such as temperature and viscosity.

The sensor 220 includes a flat substrate 213 and a recessed substrate 224 that are bonded together. The recessed substrate 224 has six substantially equally sized recesses therein, forming two groups of recesses. The first group includes three recesses 227 (only one of the three recesses 227 is shown in FIG. 13) forming three sealed cavities 228, respectively, within the sensor 220. The second group includes three recesses 229 forming three open cavities 226, respectively, within the sensor 220. The recessed substrate 224 includes two groups of membranes 221 and 222 integrally formed within the substrate 224 and overlying the cavities 226 and 228, respectively. The areas of the membranes 221 and 222 are approximately equal and both groups of membranes 221 and 222 are of substantially equal thickness and are thin relative to the substrate 213. Each of the three membranes 221 has a hole 225 therewithin. Thus, while the cavities 228 are sealed, the cavities 226 are open cavities and the pressure within cavities 226 is equal to the pressure outside the sensor 220.

The mode of operation of tile compensated pressure sensor 220 is similar to that of the compensated pressure sensor 120 of FIG. 10 as disclosed hereinabove, except that the sensor 220 has a stronger signal amplitude since it has more vibratable membranes compared to the sensor 120.

It is a feature of the sensor 220 of the present invention that the beam of ultrasonic radiation emanating from the sensor as a result of the ultrasonic irradiation from the transceiver 22 is generally wider than the beam of ultrasonic radiation emanating from a sensor having a single vibratable membrane of the same dimensions as one of the vibratable membranes of sensor 220.

It is noted that, while the sensor 220 is shown to include six vibratable membranes, a different suitable number of membranes can be used depending on the desired signal amplitude.

It is further noted that, while the compensated sensor 220 is used for pressure measurement, other compensated and noncompensated sensors having multiple vibratable membranes can be constructed for measuring other physical variables. Non-limiting examples of such physical variables are pressure, temperature, chemical composition, viscosity and the thickness of a layer overlying the sensor.

It is still further noted that, while the vibratable membranes 221 and 222 of the sensor 220 of FIGS. 12 and 13 are arranged in a rectangular array, other arrangements of the vibratable membranes are possible, depending on the desired width and shape of the beam transmitted from the sensor. The shape and beam width resulting from different geometrical arrays of vibratable membranes can be varied by selecting the appropriate parameters of the beam of a single vibratable membrane and by varying the parameters and geometry of the array of vibratable membranes.

It is noted that, while the compensation methods disclosed hereinabove are preferably implemented with all the vibratable membranes formed from the same substrate, they can also be implemented using two physically separate sensors having non-overlapping resonance frequencies over the working range, provided that they are placed in close proximity to each other so that they sense essentially the same values of the physical variables.

It is further noted that for all the sensors 84, 90, 100, 110, 120, 130 and 220 disclosed hereinabove and illustrated in FIGS. 6–13, the substrates 83, 93, 103, 113 and 213 that do not include the vibratable membranes can be made of any suitable material. Non-limiting examples are silicon, borosilicate glass (Pyrex) and metal.

It is still further noted that the substrates within which vibratable membranes 81, 95, 101, 111, 112, 121, 122, 221 and 222 are formed, can be made of any suitable material. Non limiting examples are silicon, silicon nitride and silicon dioxide.

It is additionally noted that, the various methods for compensating the values of physical variables obtained from passive ultrasonic sensors disclosed hereinabove can be used in sensors for measuring various different physical variables. For example a compensated sensor for measuring viscosity can be constructed similarly to the sensor 110 of FIG. 9, wherein the two membranes 111 and 112 have non-overlapping resonance frequencies within the working range. A compensated value of the viscosity can be calculated from the different resonance frequencies of the two membranes 111 and 112.

It will be appreciated by persons skilled in the art, that the present invention is not limited to what has been particularly shown and described hereinabove. Rather the scope of the present invention is defined by the claims which follow.

What is claimed is:

1. A passive compensated sensor system utlizing ultrasonic energy, the system comprising:

at least one compensated pair of ultrasonically vibratable sensors, each of said sensors of said at least one compensated pair of passive sensors having at least one vibration frequency which is a function of at least a physical variable to be sensed; and an ultrasonic activation and detection system for exciting said at least one compensated pair of sensors and for detecting said at least one vibration frequency of each of said sensors thereby to determine a value of said physical variable, said value being compensated for the effects of other physical variables on said at least one vibration frequency.

2. A system according to claim 1 wherein each sensor of said at least one compensated pair of passive sensors comprises:

at least one cavity formed in at least one substrate; and at least one vibratable membrane overlying said at least one cavity.

3. A system according to claim 2 wherein said at least one compensated pair of passive sensors is formed in a single slab of material forming said at least one substrate.

4. A system according to claim 2 wherein said sensors of said at least one compensated pair of passive sensors are separate sensors, formed in two separate slabs of material, each of said slabs forming said substrate for a single sensor.

5. A system according to claim 2 wherein said at least one cavity of at least one sensor of said at least one compensated pair of passive sensors is a sealed cavity.

6. A system according to claim 2 wherein said vibratable membranes have different areas for each of said sensors of said at least one compensated pair of passive sensors.

7. A system according to claim 2 wherein said vibratable membranes of each of said sensors of said at least one compensated pair of passive sensors, have non-overlapping output vibration frequencies.

8. A system according to claim 2 wherein said vibratable membranes of each of said sensors of said at least one compensated pair of passive sensors have an approximately equal area and thickness.

9. A system according to claim 2 wherein said vibratable membranes of each of said sensors of said at least one compensated pair of passive sensors have approximately similar output vibration frequencies.

10. A system according to claim 2 wherein the physical variable to be sensed is pressure, and wherein said at least one vibratable membrane of one of said at least one compensated pair of passive sensors has a hole therethrough for equalizing the pressure with and without said cavity of said sensor, thereby rendering said at least one vibratable membrane non-responsive to pressure changes without substantially changing the responsiveness of said at least one vibratable membrane to physical variables other than pressure, wherein said at least one vibratable membrane is operative to provide a reference vibration frequency for compensating the effects of physical variables other than pressure on the vibration frequency of the vibratable membrane of the other sensor of said at least one compensated pair of passive sensors.

11. A system according to claim 2 wherein said at least one vibratable membrane of one of said at least one pair of sensors further comprises a film attached thereto, said film being exposed to the sensor's external environment, said film being made of a material capable of selectively adsorbing a specific chemical from said external environment, thereby making said at least one vibratable membrane responsive to the concentration of said specific chemical within said external environment.

12. A method according to claim 2 wherein said sensors of said at least one compensated pair of passive sensors are within close proximity of each other.

13. A system according to claim 1, and wherein said ultrasonic activation and detection system comprises:
an ultrasonic wave generator for generating an ultrasonic wave having a desired frequency band;
an ultrasonic transducer system for transmitting said ultrasonic wave and for receiving an ultrasonic wave in response; and
a frequency detector for detecting said vibration frequencies of said at least one compensated pair of sensors from said received ultrasonic wave, thereby to determine a compensated value of said physical variable.

14. A method of measuring a physical variable of a body, the method comprising the steps of:

activating, via an ultrasonic wave, at least one compensated pair of passive sensors located within the body and having two output vibration frequencies, at least one of said output vibration frequencies being a function of said physical variable;
detecting said two output vibration frequencies; and
determining a compensated value of said physical variable from said detected two output vibration frequencies.

15. A method according to claim 14 wherein each of said two output vibration frequencies is differently responsive to said physical variable.

16. A method according to claim 14 wherein one of said two output vibration frequencies of said at least one compensated pair of passive sensors is non-responsive to said physical variable and wherein said step of determining comprises the step of using said non-responsive output vibration frequency as a reference frequency, thereby compensating for the effect of other physical variables on the output vibration frequency responsive to said physical variable.

17. A method according to claim 14 wherein said two output vibration frequencies are substantially non-overlapping.

18. A method according to claim 14 wherein said sensors of said at least one compensated pair of passive sensors are within close proximity of each other.

19. A method of measuring a physical variable of a body, the method comprising the steps of:

activating, via an ultrasonic wave, at least one compensated pair of passive sensors located within the body and having two output vibration frequencies which are substantially close to each other, at least one of said output vibration frequencies being a function of said physical variable;
detecting the beat frequency created by said two output vibration frequencies; and
determining a compensated value of said physical variable from said detected beat frequency.

20. A method according to claim 19 wherein each of said two output vibration frequencies is differently responsive to said physical variable.

21. A method according to claim 19 wherein one of said two output vibration frequencies of said at least one compensated pair of passive sensors is a reference frequency which is non-responsive to said physical variable and the other vibration frequency is responsive to said physical variable and wherein said step of determining comprises the step of using said beat frequency, created by said non-responsive reference frequency and said responsive vibration frequency, to determine a value of said physical variable compensated for the effect of other physical variables on the vibration frequency responsive to said physical variable.

22. A method of measuring a physical variable of a body, the method comprising the steps of:

transmitting an ultrasonic wave having a first range of vibration frequencies through said body thereby to activate at least one compensated pair of passive sensors located within said body, said at least one compensated pair of passive sensors having at least one input vibration frequency within said first range and at least two output vibration frequencies, wherein at least one of said output vibration frequencies is a function of said physical variable;
detecting said two output vibration frequencies; and
determining a compensated value of said physical variable from said detected two output vibration frequencies.

23. A method according to claim 22 wherein each of said two output vibration frequencies is differently responsive to said physical variable.

24. A method according to claim 22 wherein one of said two output vibration frequencies of said at least one compensated pair of passive sensors is non-responsive to said physical variable and wherein said step of determining comprises the step of using said non-responsive output vibration frequency as a reference frequency, thereby compensating for the effect of other physical variables on the output vibration frequency responsive to said physical variable.

25. A method according to claim 22 wherein said two output vibration frequencies are substantially non-overlapping.

26. A method according to claim 22 wherein said sensors of said at least one compensated pair of passive sensors are within close proximity of each other.

27. A method of measuring a physical variable of a body, the method comprising the steps of:

transmitting an ultrasonic wave having a first range of vibration frequencies through said body thereby to activate at least one passive compensated pair of sensors located within said body, said at least one passive compensated pair of sensors having at least one input vibration frequency within said first range, and two output frequencies, at least one of said output frequencies is a function of said physical variable, said two output vibration frequencies being substantially close to each other;

detecting the beat frequency created by said two output vibration frequencies; and determining a compensated value of said physical variable from said detected beat frequency.

28. A method according to claim 27 wherein said sensors of said compensated pair of sensors are within close proximity of each other.

* * * * *